United States Patent
Adachi et al.

(10) Patent No.: US 6,758,049 B2
(45) Date of Patent: Jul. 6, 2004

(54) VEHICLES AND AIR CONDITIONING SYSTEMS FOR SUCH VEHICLES

(75) Inventors: Hiromitsu Adachi, Wako (JP); Masamichi Kubota, Wako (JP); Hiroshi Ikura, Wako (JP); Atsuo Inoue, Isesaki (JP); Masato Tsuboi, Isesaki (JP); Hideki Watanabe, Wako (JP)

(73) Assignees: Sanden Corporation, Gunma (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/438,326

(22) Filed: May 15, 2003

(65) Prior Publication Data

US 2004/0020229 A1 Feb. 5, 2004

(30) Foreign Application Priority Data

May 15, 2002 (JP) ........................................ 2002-140285

(51) Int. Cl.[7] .............................................. B60H 1/32
(52) U.S. Cl. ............................ 62/115; 62/236; 62/244; 165/42
(58) Field of Search ...................... 62/236, 244; 165/42, 165/43; 236/49.3

(56) References Cited

U.S. PATENT DOCUMENTS

| 4,497,240 | A | * | 2/1985 | Nagatomo et al. ............ 454/75 |
| 4,591,318 | A | | 5/1986 | Elson |
| 4,990,071 | A | | 2/1991 | Sugimoto |
| 5,385,453 | A | | 1/1995 | Fogt et al. |
| 5,435,144 | A | | 7/1995 | Kalmbach |
| 5,755,564 | A | | 5/1998 | Machida et al. |
| 5,867,996 | A | | 2/1999 | Takano et al. |
| 5,896,750 | A | * | 4/1999 | Karl ............................. 62/236 |
| 5,960,858 | A | * | 10/1999 | Hildebrand ................... 165/42 |
| 5,983,656 | A | | 11/1999 | Tokumasu |
| 6,109,045 | A | | 8/2000 | Takenaka |

(List continued on next page.)

FOREIGN PATENT DOCUMENTS

| DE | 19513710 | 10/1995 |
| EP | 1213166 | 6/2002 |
| JP | 687678 | 12/1984 |
| JP | 60153885 | 10/1985 |

*Primary Examiner*—William E. Tapolcai
(74) *Attorney, Agent, or Firm*—Baker Botts L.L.P.

(57) ABSTRACT

An air conditioning system for a vehicle includes a compressor driven by a first drive source or a second drive source, or a combination thereof, and an evaporator operationally connected to the compressor via a refrigerant circuit. The system also includes a blower for dispensing air into an interior of the vehicle via the evaporator. The blower is driven by the first drive source or the second drive source, or a combination thereof. Moreover, the system includes a controller for controlling the first drive source and the second drive source. Specifically, when a temperature of air dispensed from the evaporator is greater than a predetermined temperature and a speed of the vehicle is greater than a predetermined speed, the first drive source drives the compressor and the blower. Moreover, when the temperature of air dispensed from the evaporator is greater than the predetermined temperature, the speed of the vehicle is less than the predetermined speed, and a voltage of a power source of the second drive source is less than or equal to a predetermined voltage, the compressor is inactive and the second drive source drives the blower.

26 Claims, 3 Drawing Sheets

U.S. PATENT DOCUMENTS

| | | |
|---|---|---|
| 6,192,155 B1 | 2/2001 | Fan |
| 6,217,297 B1 | 4/2001 | Tsumagari et al. |
| 6,230,507 B1 | 5/2001 | Ban et al. |
| 6,234,769 B1 | 5/2001 | Sakai et al. |
| 6,247,899 B1 | 6/2001 | Ban et al. |
| 6,287,081 B1 | 9/2001 | Tamegai et al. |
| 6,334,755 B1 | 1/2002 | Coudray et al. |
| 6,375,436 B1 | 4/2002 | Irie et al. |
| 6,443,712 B2 | 9/2002 | Sakai et al. |
| 6,543,243 B2 | 4/2003 | Mohrmann et al. |
| 2001/0047659 A1 | 12/2001 | Nakamura et al. |
| 2001/0049943 A1 | 12/2001 | Nakamura et al. |
| 2003/0053916 A1 | 3/2003 | Terauchi |
| 2003/0136138 A1 | 7/2003 | Tsuboi et al. |
| 2003/0152467 A1 | 8/2003 | Higashiyama et al. |
| 2004/0000156 A1 | 1/2004 | Inoue et al. |
| 2004/0001760 A1 | 1/2004 | Yoshii et al. |
| 2004/0020229 A1 | 2/2004 | Adachi et al. |

\* cited by examiner

VEHICLES AND AIR CONDITIONING SYSTEMS FOR SUCH VEHICLES

BACKGROUND OF THE INVENTION

1. Field of the Invention

The present invention relates generally to vehicles and air conditioning systems for use in such vehicles. In particular, the present invention is directed towards vehicles and air conditioning systems in which a compressor of the air conditioning system may be inactive, but a blower of the air conditioning system may be active, during vehicle operation.

2. Description of Related Art

Known hybrid vehicles include a first drive source, e.g., an engine, a second drive source, e.g., an electric motor, and an air conditioning system. The air conditioning system includes a compressor and a blower. The blower dispenses air into an interior of the vehicle. For example, the blower dispenses cooled air into the interior of the vehicle when a driver of the vehicle signals to decrease a temperature within the vehicle from an measured temperature to a first predetermined temperature which is less than the measured temperature. Similarly, the blower dispenses heated air into the interior of the vehicle when a driver of the vehicle signals to increase a temperature within the vehicle from the measured temperature to a second predetermined temperature which is greater than the measured temperature. Moreover, the first drive source and the second drive source drive the vehicle, the compressor, and the blower. When the driver of the vehicle activates an ignition of the vehicle, a vehicle operation commences. In such known vehicles, when the vehicle is stationary during vehicle operation, e.g., when the driver of the vehicle stops the vehicle at a stop sign, a red light, or the like, and predetermined conditions are satisfied, the compressor transitions from active to inactive, i.e., the compressor is deactivated. Moreover, when the compressor transitions from active to inactive, the blower also transitions from active to inactive.

Nevertheless, when the blower is inactive, air is not dispensed into the interior of the vehicle from the air conditioning system. Consequently, after the blower transitions from active to inactive, a temperature of air within the interior of the vehicle increases or decreases. Whether the temperature of air within the interior of the vehicle increases or decreases depends on whether the driver previously signaled for the air conditioning system to dispense cooled air or heated air. Specifically, when the driver previously signaled for the air conditioning system to dispense cooled air, the temperature of air within the interior of the vehicle increases. Similarly, when the driver previously signaled for the air conditioning system to dispense heated air, the temperature of air within the interior of the vehicle decreases.

SUMMARY OF THE INVENTION

Therefore, a need has arisen for vehicles and air conditioning systems which overcome these and other shortcomings of the related art. A technical advantage of the present invention is that when the compressor transitions from active to inactive during vehicle operation, the blower remains active. Consequently, a rate at which the temperature of air within the vehicle increases or decreases after the compressor transitions from active to inactive is less than in the known vehicles and air conditioning systems.

In an embodiment of the present invention, an air conditioning system for a vehicle comprises at least one compressor driven by a first drive source or a second drive source, or a combination thereof, and an evaporator operationally connected to the at least one compressor via a refrigerant circuit. For example, the first drive source and the second drive source may simultaneously or selectively drive the at least one compressor. The system also comprises a blower for dispensing air into an interior of the vehicle via the evaporator. The blower is driven by the first drive source or the second drive source, or a combination thereof. For example, the first drive source and the second drive source may simultaneously or selectively drive the blower. Further, the system comprises means for controlling the first drive source and the second drive source, e.g., a controller.

Specifically, when a temperature of air dispensed from the evaporator is greater than a first predetermined temperature and a speed of the vehicle is greater than a predetermined speed, the first drive source drives the at least one compressor and the blower. Moreover, when the temperature of air dispensed from the evaporator is greater than a second predetermined temperature, the speed of the vehicle is less than the predetermined speed, and a voltage of a power source of the second drive source is less than or equal to a predetermined voltage, the at least one compressor is inactive and the second drive source drives the blower. For example, the first predetermined temperature may be about the same as the second predetermined temperature. In another embodiment, when the temperature of air dispensed from the evaporator is greater than the second predetermined temperature, the speed of the vehicle is less than the predetermined speed, and the voltage of the power source is greater than the predetermined voltage, the second drive source drives the blower and the at least one compressor. Moreover, the first drive source or the second drive source, or a combination thereof, may drive the vehicle. For example, the first drive source and the second drive source may selectively or simultaneously drive the vehicle, e.g., in a hybrid vehicle, or only the first drive source may drive the vehicle, e.g., in a non-hybrid vehicle.

In another embodiment of the present invention, a vehicle comprises a first drive source, a second drive source, and an air conditioning system. The air conditioning system comprises at least one compressor driven by a first drive source or a second drive source, or a combination thereof, and an evaporator operationally connected to the at least one compressor via a refrigerant circuit. For example, the first drive source and the second drive source may simultaneously or selectively drive the at least one compressor. The system also comprises a blower for dispensing air into an interior of the vehicle via the evaporator. The blower is driven by the first drive source or the second drive source, or a combination thereof For example, the first drive source and the second drive source may simultaneously or selectively drive the blower. Further, the system comprises means for controlling the first drive source and the second drive source, e.g., a controller. Specifically, when a temperature of air dispensed from the evaporator is greater than a first predetermined temperature and a speed of the vehicle is greater than a predetermined speed, the first drive source drives the at least one compressor and the blower. Moreover, when the temperature of air dispensed from the evaporator is greater than a second predetermined temperature, the speed of the vehicle is less than the predetermined speed, and a voltage of a power source of the second drive source is less than or equal to a predetermined voltage, the at least one compressor is inactive and the second drive source drives the blower.

In another embodiment of the present invention, a method of controlling an air conditioning system for a vehicle comprises the step of driving at least one compressor and a blower via a first drive source, when a temperature of air dispensed from an evaporator is greater than a first predetermined temperature and a speed of the vehicle is greater than a predetermined speed. The method also comprises the step of deactivating the at least one compressor and driving the blower via a second drive source when the temperature of air dispensed from the evaporator is greater than a second predetermined temperature, the speed of the vehicle is less than the predetermined speed, and a voltage of a power source of the second drive source is less than or equal to a predetermined voltage.

Other objects, features, and advantage will be apparent to persons of ordinary skill in the art from the following detailed description of the invention and the accompanying drawings.

BRIEF DESCRIPTION OF THE DRAWINGS

For a more complete understanding of the present invention, the needs satisfied thereby, and the objects, features, and advantages thereof, reference now is made to the following description taken in connection with the accompanying drawings.

DETAILED DESCRIPTION OF PREFERRED EMBODIMENTS

Figure 1:
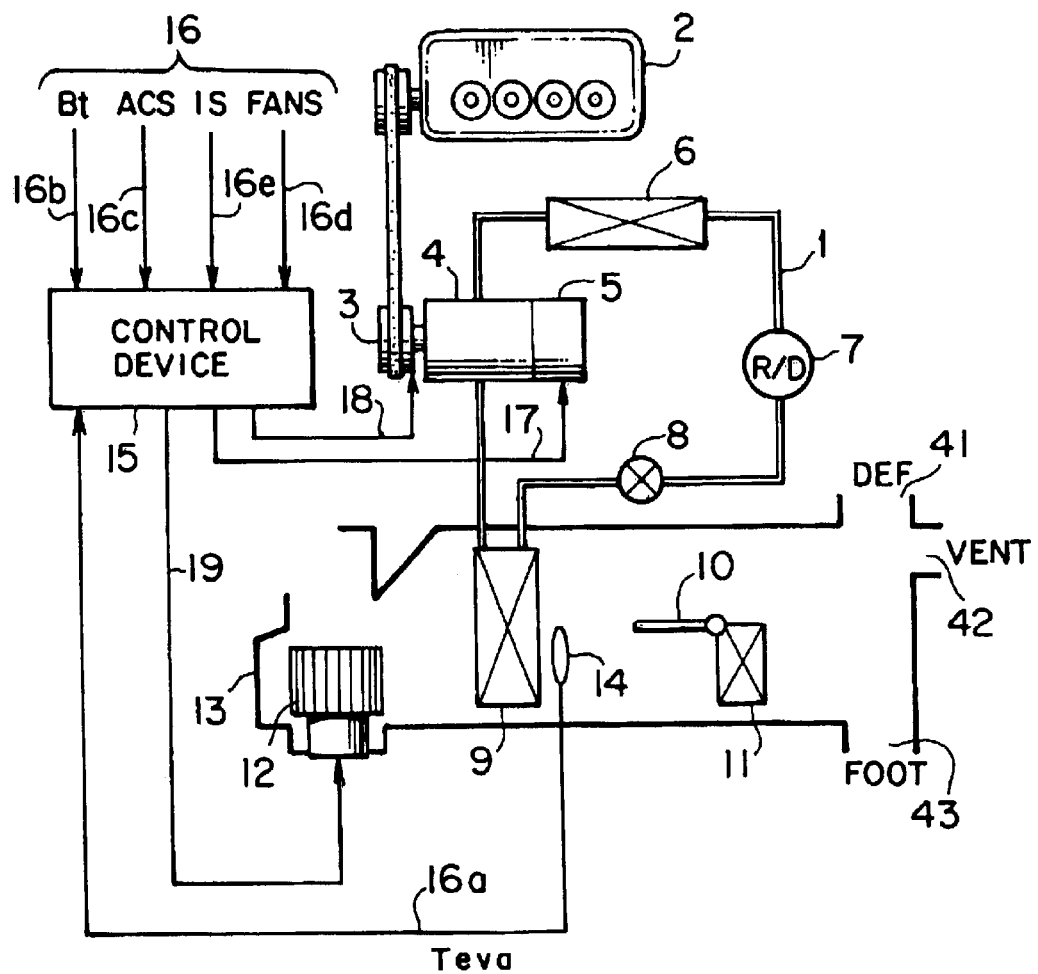
FIG. 1 is a schematic diagram of an air conditioning system for a vehicle according to an embodiment of the present invention.
Figure 2:
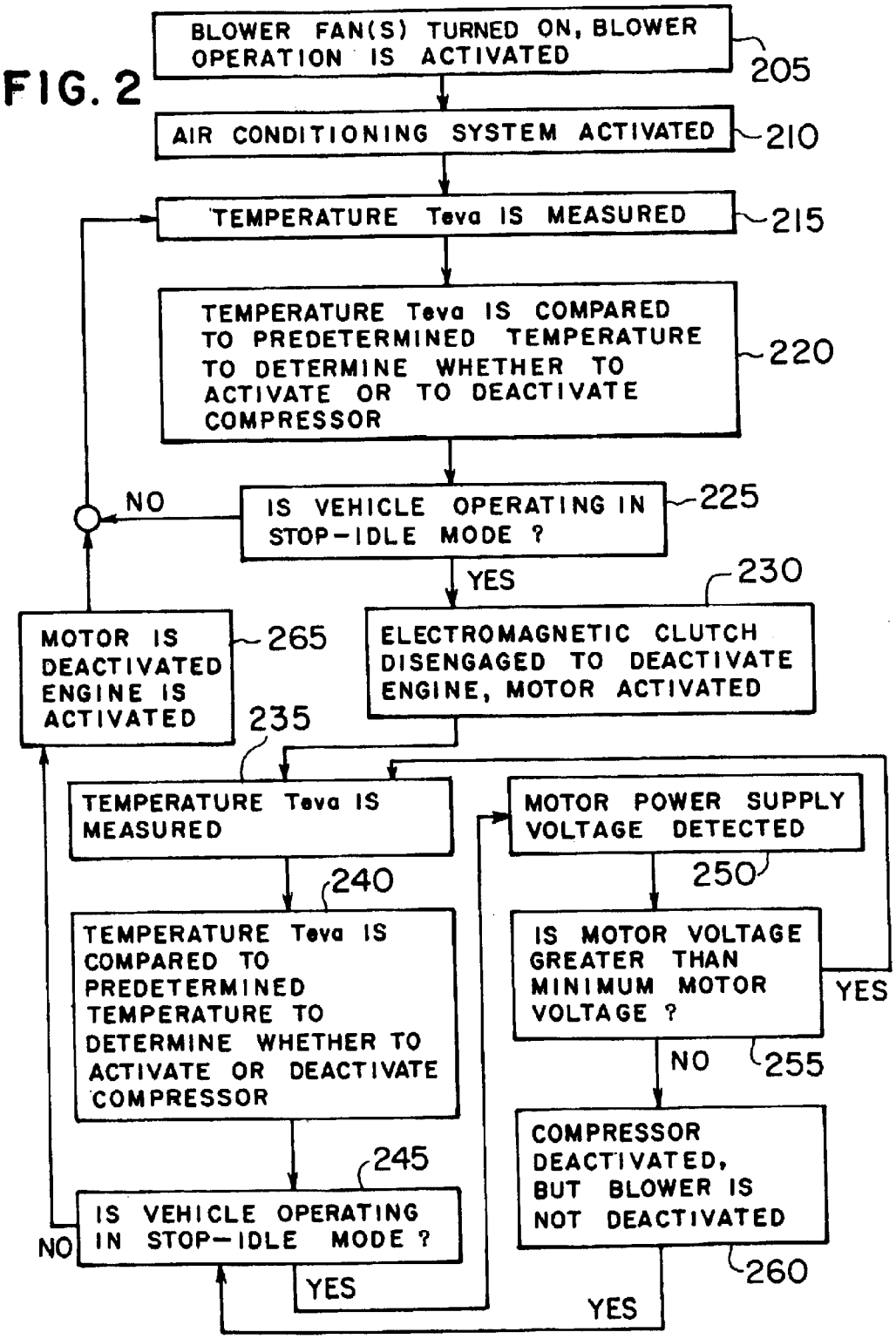
FIG. 2 is flow chart depicting an operation of the air conditioning system of FIG. 1.
Figure 3:
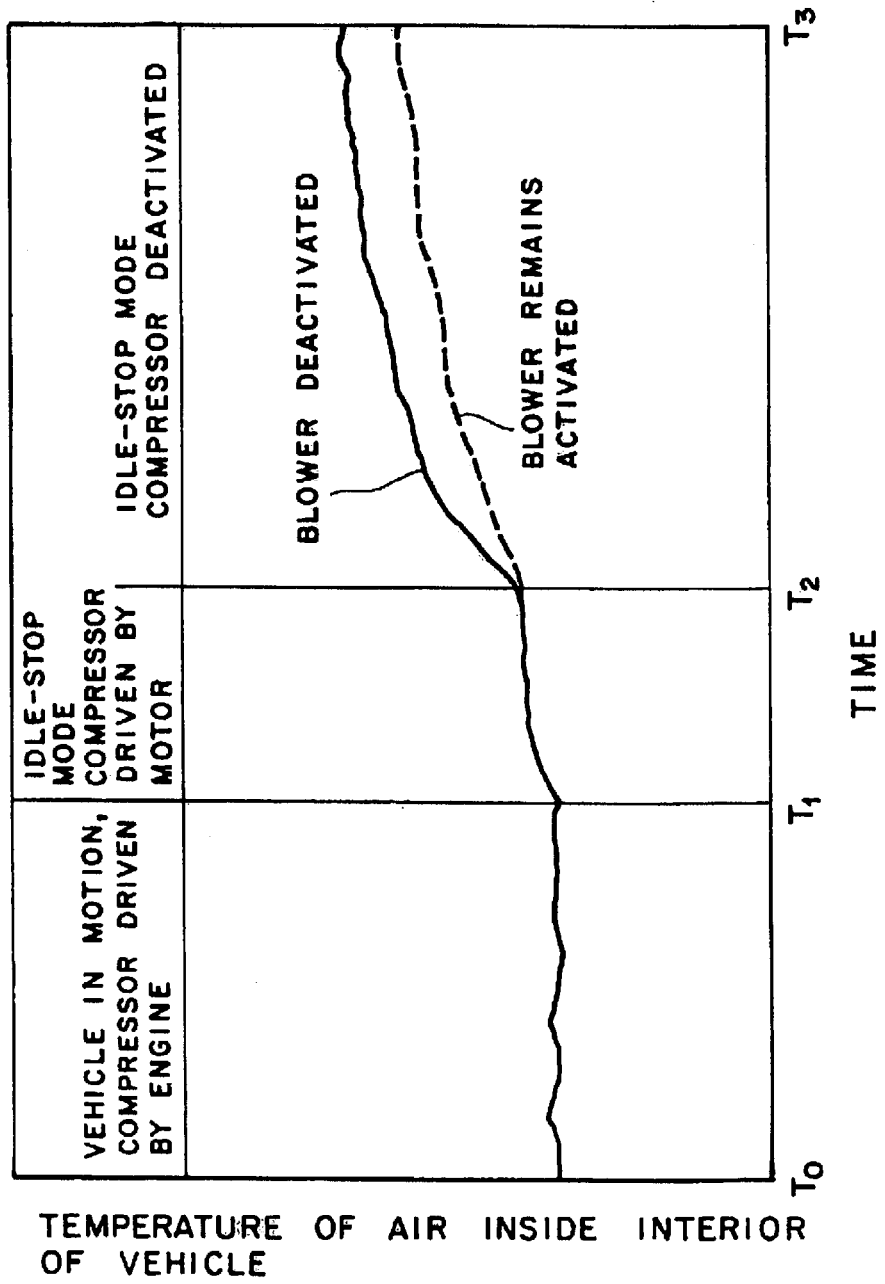
FIG. 3 is a graph depicting a rate of temperature increase within the vehicle using a known air conditioning system, and a rate of temperature increase within the vehicle using the air conditioning system of FIG. 1.

Preferred embodiments of the present invention and their features and advantages may be understood by referring to FIGS. 1–3, like numerals being used for like corresponding parts in the various drawings.

Referring to FIG. 1, an air conditioning system 100 of a vehicle (not shown) according to an embodiment of the present invention is depicted. Air conditioning system 100 may comprise at least one compressor 4, e.g., a hybrid compressor, a pair of compressors, or the like, and a refrigeration system 1. Compressor 4 may be similar to a compressor described in Japanese Patent Applications Nos. 2001-280630 and 2002-31664. The vehicle may comprise a first drive source 2, e.g., an engine, a second drive source 5, e.g., an electric motor, or both.

In an embodiment of the present invention, when compressor 4 is a hybrid compressor, compressor 4 may comprise a first compression mechanism (not shown) and a second compression mechanism (not shown). Specifically, first drive source 2 may drive the first compression mechanism, and second drive source 5 may drive the second compression mechanism. Moreover, air conditioning system 100 may comprise means for selecting whether first drive source 2 or second drive source 5, or both, drives compressor 4. For example, the means for selecting may comprise a controller 15, and first drive source 2 and second drive source 5 may operate selectively or simultaneously in response to electrical, mechanical, or electro-mechanical control signals from controller 15. The vehicle also may comprise an electromagnetic clutch 3 for transmitting a rotational force from first drive source 2 to a drive shaft (not shown) of compressor 4. In this embodiment, the drive shaft may comprise a first portion and a second portion. Specifically, first drive source 2 may drive the first portion of the drive shaft via electromagnetic clutch 3, and second drive source 5 may drive the second portion of the drive shaft in response to the control signals from controller 15. The operation of first drive source 2 and second drive source 5 is discussed in greater detail below.

In another embodiment of the present invention, air conditioning system 100 may comprise a pair of compressors 4. Specifically, a first of compressors 4 may comprise a first drive shaft, and a second of compressors 4 may comprise a second drive shaft. Moreover, first drive source 2 may drive the first drive shaft via electromagnetic clutch 3, and second drive source 5 may drive the second drive shaft via controller 15.

In any of the above-described embodiments of the present invention, refrigeration system 1 may comprise a plurality of refrigeration tubes, and a refrigerant may be circulated within refrigeration system 1 via the refrigeration tubes. Refrigerant system may comprise compressor 4, a condenser 6; a receiver 7, an expansion valve 8; and an evaporator 9. Compressor 4 may be operationally connected to condenser 6, and condenser 6 may be operationally connected to receiver 7. Receiver 7 may be operationally connected to expansion valve 8, and expansion valve 8 may be operationally connected to evaporator 9. Moreover, evaporator 9 may be operationally connected to compressor 4, such that compressor 4, condenser 6, receiver 7, expansion valve 8, and evaporator 9 form a closed, refrigeration circuit. In operation, compressor 4 may receive refrigerant gas from evaporator 9 and also may compress that refrigerant gas. Compressing the refrigerant gas may increase a temperature of the refrigerant gas and also may increase a pressure of the refrigerant gas. Compressor 4 may pass the compressed refrigerant gas to condenser 6. When the compressed refrigerant gas flows through condenser 6, at least a portion of the refrigerant gas may condense into a liquid refrigerant. Moreover, condenser 6 may pass the condensed refrigerant to receiver 7, and receiver 7 may divide the condensed refrigerant into a liquid refrigerant portion and a refrigerant gas portion. Receiver 7 may pass the liquid refrigerant portion of the refrigerant to expansion valve 8, which may decrease the pressure of the liquid refrigerant. When expansion valve 8 reduces the pressure of the liquid refrigerant, expansion valve 8 may pass the refrigerant to evaporator 9, and mix the refrigerant with air dispensed by blower 12, which may evaporate the liquid refrigerant into a refrigerant gas. The refrigerant gas then may be passed to compressor 4.

Air conditioning system 100 also may comprise a heater core 11 positioned at a downstream side of evaporator 9, and an air mix damper 10 formed between the downstream side of evaporator 9 and an upstream side of heater core 11. Air mix damper 10 may be driven by a servo motor (not shown). The movement of air mix damper 10 may control a volume of air capable passing through heater core 11 via evaporator 9, which may control the air temperature within the interior of the vehicle. Moreover, blower 12, evaporator 9, air mix damper 10, and heater core 11 may be positioned within an air duct 13. Air conditioning system 100 also may comprise a first discharge port 41, a second discharge port 42, and a third discharge port 43, and discharge ports 41–43 may be positioned at a downstream side of air duct 13. For example, first discharge port 41 may be formed above third discharge port 43, and second discharge port 42 may be formed between first discharge port 41 and third discharge port 43.

Moreover, first discharge port 41 may be used during a DEFROST mode, second discharge port 42 may be used in a VENT mode, and third discharge port 43 may be a FOOT mode. Such modes may determine the source from which the air entering the interior of the vehicle is drawn, or the direction in which the entering air blows, or both.

A temperature sensor 14 for measuring a temperature $T_{eva}$ of air dispensed from evaporator 9 may be positioned between evaporator 9 and heater core 11. Temperature sensor 14 also may be operationally connected to controller 15. Specifically, temperature sensor 14 transmits a first signal 16a to controller 15 indicating a value of $T_{eva}$. In an embodiment of the present invention, the vehicle also may comprise an electrical power supply (not shown), e.g., a battery, for second drive source 5, and controller 15 may receive a second signal 16b from the electrical power supply indicating a voltage $B_t$ of the electrical power supply. Controller 15 also may receive a third signal 16c indicating whether air conditioning system 100 currently is operating, and a fourth signal 16d indicating whether at least one fan (not shown) of blower 12 currently is operating. Moreover, controller 15 may receive a fifth signal 16e indicating whether the vehicle is in an idle-stop mode. An idle-stop mode occurs when a speed of the vehicle is less than a predetermined speed, e.g., about zero kilometers per hour, during vehicle operation. Based on first signal 16a, second signal 16b, third signal 16c, fourth signal 16d, or fifth signal 16e, or a combination thereof, controller 15 may generate a first control signal 17 for controlling a rotational speed of second drive source 5, a second control signal 18 for controlling the engagement and disengagement of electromagnetic clutch 3, and a third control signal 19 for controlling the dispensing of air from blower 12.

Specifically, when second drive source 5 drives compressor 4, electromagnetic clutch 3 may be disengaged, and first control signal 17 may control the rotational speed of second drive source 5. Nevertheless, when first drive source 2 drives compressor 4, first control signal 17 may be deactivated, and electromagnetic clutch 3 may be engaged. In another embodiment of the present invention, first drive source 2 and second drive source 5 may operate simultaneously. Moreover, based on temperature $T_{eva}$ of air dispensed from evaporator 9, controller 15 may select the rotational speed of second drive source 5, or determine whether to engage or disengage electromagnetic clutch 3, or both.

Referring to FIG. 2, an operation 200 of air conditioning system 100 according to an embodiment of the present invention is depicted. In step 205, the at least one fan of blower 12 transitions from inactive to active, i.e., is activated, such that the operation of blower 12 commences, and controller 15 receives fourth signal 16d. In step 210, air conditioning system 100 transitions from active to inactive, i.e., is activated, and controller 15 receives third signal 16c. Moreover, in step 215, temperature sensor 14 measures temperature $T_{eva}$ of air dispensed from evaporator 9, and transmits first signal 16a to controller 15. In step 220, controller 15 compares temperature $T_{eva}$ to a predetermined temperature and transmits second control signal 18 to electromagnetic clutch 3. For example, when temperature $T_{eva}$ is greater than or equal to the predetermined temperature, first drive source 2 drives compressor 4. Similarly, when temperature $T_{eva}$ is less than the predetermined temperature, compressor 4 remains inactive or transitions from active to inactive if compressor 4 previously was active. In an embodiment, the predetermined temperature may be about 4° C., and temperature sensor 14 may have an accuracy of about 1° C. As such, when temperature $T_{eva}$ is greater than or equal to about 4° C., first drive source 2 may drive compressor 4, and when temperature $T_{eva}$ is less than or equal to about 3° C., compressor 4 remains inactive or becomes inactive if compressor 4 previously was active. In step 225, controller 15 receives fifth signal 16e, and determines whether the vehicle is in the idle-stop mode, i.e., when the speed of the vehicle is less than the predetermined speed during vehicle operation. If the vehicle currently is not in the idle-stop mode, the operation of air conditioning system 100 returns to step 215. Nevertheless, if the vehicle currently is in the idle-stop mode, the operation of air conditioning system 100 proceeds to step 230.

In step 230, first drive source 2 transitions from active to inactive, i.e., is activated, and second drive source 5 active to inactive, i.e., is activated. In step 235, temperature sensor 14 measures temperature $T_{eva}$ of air dispensed from evaporator 9, and transmits first signal 16a to controller 15. In step 240, controller 15 compares temperature $T_{eva}$ to the predetermined temperature and transmits first control signal 18 to second drive source 5. For example, when temperature $T_{eva}$ is greater than or equal to the predetermined temperature, second drive source 5 drives compressor 4. Similarly, when temperature $T_{eva}$ is less than the predetermined temperature, compressor 4 remains inactive or transitions from active to inactive if compressor 4 previously was active. Moreover, in step 245, controller receives fifth signal 16c, and determines whether the vehicle still is in the idle-stop mode.

If the vehicle still is in the idle-stop mode, the operation of air conditioning system 100 proceeds to step 250. In step 250, controller 15 receives second signal 16b, and determines voltage $B_t$ of the electrical power supply for second drive source 5. In step 255, controller 15 determines whether voltage $B_t$ is greater than a minimum electrical power supply voltage $B_{t0}$, e.g., a voltage sufficient for second drive source 5 to drive compressor 4. If voltage $B_t$ is greater than minimum electrical power supply voltage $B_{t0}$, the operation of air conditioning system 100 returns to step 235. However, if voltage $B_t$ is less than the minimum electrical power supply voltage $B_{t0}$, the operation of air conditioning system 100 proceeds to step 260. In step 260, compressor 4 transitions from active to inactive. Nevertheless, second drive source 5 continuous to drive blower 12, and the operation of air conditioning system 100 returns to step 245.

If in step 245 controller 15 determines that the vehicle no longer is in the idle-stop mode, the operation of air conditioning system 100 proceeds to step 265. In step 265, controller 15 transmits first control signal 17 to second drive source 5, which deactivates second drive source 5. Controller 15 also transmits second control signal 18 to electromagnetic clutch 3, and electromagnetic clutch 3 engages to activate first drive source 2. Moreover, the operation of air conditioning system 100 returns to step 215. Because blower 12 remains in operation when compressor 4 is inactive during the idle-stop mode, the rate at which the temperature of air within the vehicle increases during the idle-stop mode is less than in the known vehicles. Operation 200 has been discussed with respect to a hybrid vehicle in which first drive source 2 and second drive source 5 selectively drive the vehicle, compressor 4, and blower 14. Nevertheless, operation 200 readily may be modified for vehicles in which first drive source 2 and second drive source 5 simultaneously drive the vehicle, compressor 4, and blower 14. Operation 200 also may be modified for vehicles in which first drive source 2 drives the vehicle, and first drive source 2 and second drive source 5 drive compressor 4 and blower 14.

Referring to FIG. 3, a graph depicting a rate of temperature increase within the vehicle using a known air conditioning system, and a rate of temperature increase within the vehicle using air conditioning system 100, is shown. Between a first time To and a second time $T_1$, first drive source 2 drives compressor 4. At second time $T_1$, the controller 15 detects that the vehicle is in the idle-stop mode. Between second time $T_1$ and a third time $T_2$, second drive source 5 drives compressor 4. At third time $T_2$, the controller 15 detects that voltage $B_t$ of the electrical power supply for second drive source 5 is less than or equal to the minimum electrical power supply voltage $B_{t0}$, and compressor 4 transitions from active to inactive. As shown by the solid line in FIG. 3, in the known air conditioning system, the blower also transitions from active to inactive at third time $T_2$, and the temperature within the vehicle increases at a first rate. As shown by the broken line in FIG. 3, in air conditioning system 100, second drive source 5 continues to drive blower 14 after third time $T_2$, and the temperature within the vehicle increases at a second rate which is less than the first rate. As such, in air conditioning system 100, when the vehicle is in the idle-stop mode, the temperature of air inside the vehicle remains more proximate to the temperature selected by the driver of the vehicle than in the known air conditioning system.

While the invention has been described in connection with preferred embodiments, it will be understood by those skilled in the art that variations and modifications of the preferred embodiments described above may be made without departing from the scope of the invention. Other embodiments will be apparent to those skilled in the art from a consideration of the specification or from a practice of the invention disclosed herein. It is intended that the specification and the described examples are consider exemplary only, with the true scope of the invention indicated by the following claims.

What is claimed is:

1. An air conditioning system for a vehicle comprising:
   at least one compressor driven by a first drive source or a second drive source, or a combination thereof,
   an evaporator operationally connected to the at least one compressor via a refrigerant circuit;
   a blower for dispensing air into an interior of the vehicle via the evaporator, wherein the blower is driven by the first drive source or the second drive source, or a combination thereof, and
   means for controlling the first drive source and the second drive source, such that:
   when a temperature of air dispensed from the evaporator is greater than a first predetermined temperature and a speed of the vehicle is greater than a predetermined speed, the first drive source drives the at least one compressor and the blower; and
   when the temperature of air dispensed from the evaporator is greater than a second predetermined temperature, the speed of the vehicle is less than the predetermined speed, and a voltage of a power source of the second drive source is less than or equal to a predetermined voltage, the at least one compressor is inactive and the second drive source drives the blower.

2. The air conditioning system of claim 1, wherein when the temperature of air dispensed from the evaporator is greater than the second predetermined temperature, the speed of the vehicle is less than the predetermined speed, and the voltage of the power source is greater than the predetermined voltage, the second drive source drives the blower and the at least one compressor.

3. The air conditioning system of claim 1, wherein the first predetermined temperature is about equal to the second predetermined temperature.

4. The air conditioning system of claim 3, wherein the first predetermined temperature is about 4° C.

5. The air conditioning system of claim 1, wherein the predetermined speed is about zero kilometers per hour.

6. The air conditioning system of claim 1, wherein the means for controlling comprises a controller.

7. The air conditioning system of claim 1, wherein the first drive source and the second drive source selectively drive the at least one compressor and the blower.

8. The air conditioning system of claim 1, wherein the first drive source and the second drive source simultaneously drive the at least one compressor and the blower.

9. The air conditioning system of claim 1, wherein the first drive source comprises an engine and the second drive source comprises an electric motor.

10. The air conditioning system of claim 1, wherein the vehicle is driven by the first drive source or the second drive source, or a combination thereof.

11. The air conditioning system of claim 1, wherein the at least one compressor is a hybrid compressor comprising:
    a first compression mechanism driven by the first drive source; and
    a second compression mechanism driven by the second drive source.

12. A vehicle comprising:
    a first drive source;
    a second drive source; and
    an air conditioning system comprising:
    at least one compressor driven by a first drive source or a second drive source, or a combination thereof;
    an evaporator operationally connected to the at least one compressor via a refrigerant circuit;
    a blower for dispensing air into an interior of the vehicle via the evaporator, wherein the blower is driven by the first drive source or the second drive source, or a combination thereof; and
    means for controlling the first drive source and the second drive source, such that:
    when a temperature of air dispensed from the evaporator is greater than a first predetermined temperature and a speed of the vehicle is greater than a predetermined speed, the first drive source drives the at least one compressor and the blower; and
    when the temperature of air dispensed from the evaporator is greater than a second predetermined temperature, the speed of the vehicle is less than the predetermined speed, and a voltage of a power source of the second drive source is less than or equal to a predetermined voltage, the at least one compressor is inactive and the second drive source drives the blower.

13. The vehicle of claim 12, wherein when the temperature of air dispensed from the evaporator is greater than the second predetermined temperature, the speed of the vehicle is less than the predetermined speed, and the voltage of the power source is greater than the predetermined voltage, the second drive source drives the blower and the at least one compressor.

14. The vehicle of claim 12, wherein the first predetermined temperature is about equal to the second predetermined temperature.

15. The vehicle of claim 14, wherein the first predetermined temperature is about 4° C.

16. The vehicle of claim 12, wherein the predetermined speed is about zero kilometers per hour.

17. The vehicle of claim 12, wherein the means for controlling comprises a controller.

18. The vehicle of claim 12, wherein the first drive source and the second drive source selectively drive the at least one compressor and the blower.

19. The vehicle of claim 12, wherein the first drive source and the second drive source simultaneously drive the at least one compressor and the blower.

20. The vehicle of claim 12, wherein the first drive source comprises an engine and the second drive source comprises an electric motor.

21. The vehicle of claim 12, wherein the vehicle is driven by the first drive source or the second drive source, or a combination thereof.

22. The vehicle of claim 12, wherein the at least one compressor is a hybrid compressor comprising:
    a first compression mechanism driven by the first drive source; and
    a second compression mechanism driven by the second drive source.

23. A method of controlling an air conditioning system of a vehicle, the air conditioning system comprising at least one compressor driven by a first drive source or a second drive source, or a combination thereof, an evaporator operationally connected to the at least one compressor via a refrigerant circuit, and a blower for dispensing air into an interior of the vehicle via the evaporator, wherein the blower is driven by the first drive source or the second drive source, or a combination thereof, the method comprising the steps of:
    driving the at least one compressor and the blower via the first drive source when a temperature of air dispensed from the evaporator is greater than a first predetermined temperature and a speed of the vehicle is greater than a predetermined speed; and
    deactivating the at least one compressor and driving the blower via the second drive source when the temperature of air dispensed from the evaporator is greater than a second predetermined temperature, the speed of the vehicle is less than the predetermined speed, and a voltage of a power source of the second drive source is less than or equal to a predetermined voltage.

24. The method of claim 23, further comprising the step of:
    driving the at least one compressor and the blower via the first drive source when the temperature of air dispensed from the evaporator is greater than the second predetermined temperature, the speed of the vehicle is less than the predetermined speed, and the voltage of the power source is greater than the predetermined voltage.

25. The method of claim 23, wherein the first predetermined temperature is about equal to the second predetermined temperature.

26. The method of claim 23, wherein the predetermined speed is about zero kilometers per hour.

* * * * *